No. 662,745. Patented Nov. 27, 1900.
A. & C. THOMPSON.
DEVICE FOR PREVENTING HORSES FROM CRIBBING.
(Application filed Apr. 12, 1900.)

(No Model.)

WITNESSES:
J. A. Brophy
C. R. Ferguson

INVENTORS.
Alfred Thompson.
Carl Thompson.
BY
ATTORNEYS

THE NORRIS PETERS CO., PHOTO-LITHO., WASHINGTON, D. C.

UNITED STATES PATENT OFFICE.

ALFRED THOMPSON AND CARL THOMPSON, OF FORT RANSOM, NORTH DAKOTA.

DEVICE FOR PREVENTING HORSES FROM CRIBBING.

SPECIFICATION forming part of Letters Patent No. 662,745, dated November 27, 1900.

Application filed April 12, 1900. Serial No. 12,544. (No model.)

*To all whom it may concern:*

Be it known that we, ALFRED THOMPSON and CARL THOMPSON, citizens of the United States, and residents of Fort Ransom, in the county of Ransom and State of North Dakota, have invented a new and Improved Device for Preventing Horses from Cribbing, of which the following is a full, clear, and exact description.

This invention relates to improvements in devices for preventing cribbing of horses; and the object is to provide a manger attachment so constructed that it cannot be readily grasped and held by the teeth of a horse, that is at all times free to rotate, and in which there is no danger of clogging by feed or the like.

We will describe a device to prevent horses from cribbing embodying our invention and then point out the novel features in the appended claims.

Reference is to be had to the accompanying drawings, forming a part of this specification, in which similar characters of reference indicate corresponding parts in all the figures.

Figure 1:
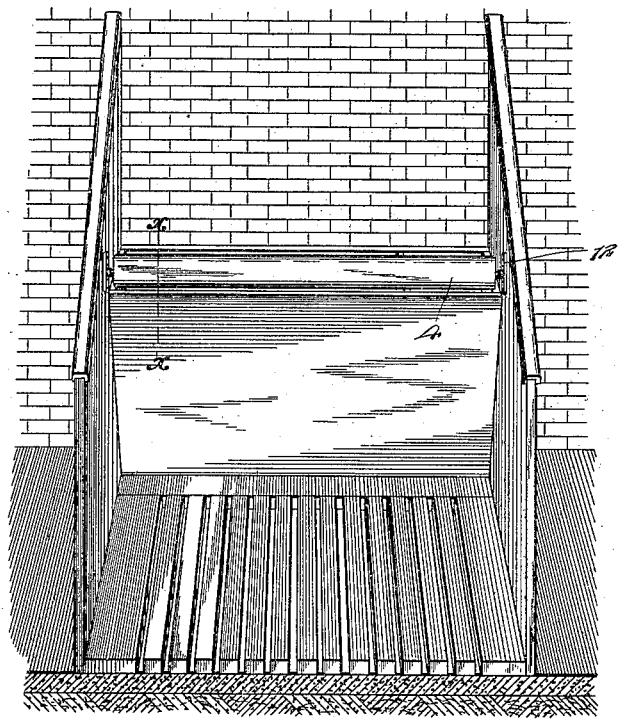
Figure 2:
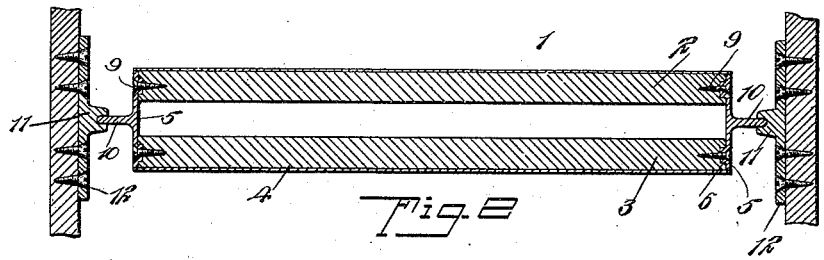
Figure 3:
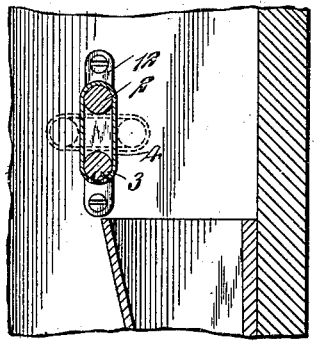
Figure 4:
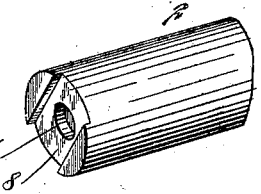
Figure 5:
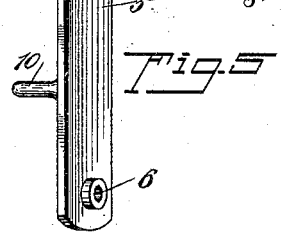

Figure 1 is a perspective view of a stall and manger, showing an attachment embodying our invention. Fig. 2 is a longitudinal section of the device. Fig. 3 is a cross-section of the device on the line $x\ x$ of Fig. 1. Fig. 4 is a perspective view of a portion of one of the supporting-bars employed, and Fig. 5 is a perspective view of a bearing-plate employed.

The device comprises a rotary part 1, which is preferably made oval in cross-section, or substantially so. As here shown, it consists of two rods or bars 2 3, spaced apart, and around these rods or bars is placed a casing 4, of suitable metal. The rods or bars are connected at their ends to bearing-plates 5, the said bearing-plates 5 being provided at their inner sides with projections 6 for engaging in recesses 7, formed in the ends of the bars, and to prevent any possible rotation of the bars relatively to the plates the bars are provided with channels 8 at the ends to receive the plates. The bars may be secured to the plates by any suitable means. We have, however, here shown screws 9 for this purpose. On the plates 5 are lugs 10, which have bearings in bosses 11 on plates 12, secured to the side walls of the stall in such position as to support the rotary part slightly above the front board of the manger, as indicated in Fig. 1. Cylindrical devices for this purpose have heretofore been employed; but they are objectionable because they are readily grasped and held by the teeth of a horse. In the present device should a horse bite upon the rotary part it will be immediately turned or rotated, thus causing the horse to release his hold, and we have found in practice that it is an absolute preventive against cribbing, while in time it will effect a perfect cure of the habit.

Having thus described our invention, we claim as new and desire to secure by Letters Patent—

1. A device to prevent horses from cribbing, comprising a rotary part arranged above and extending along the front board of a manger, the said rotary part being substantially oval in cross-section, substantially as specified.

2. A device for preventing cribbing of horses, consisting of a rotary part, comprising two bars spaced apart, plates to which the ends of said bars are connected, a metal sheathing extended over the bars, bearing-lugs on the plates, and sockets or bearings for receiving said lugs, substantially as specified.

3. A device for preventing cribbing of horses, comprising two bars spaced apart and having recesses and channels at their ends, bearing-plates having lugs on the inner sides to engage in the recesses formed in the ends of the bars while the plates are seated in the channels, bearing-lugs on the outer sides of said plates, and plates adapted to be attached to the sides of a stall and to receive the bearing-lugs on the first-named plates, substantially as specified.

In testimony whereof we have signed our names to this specification in the presence of two subscribing witnesses.

ALFRED THOMPSON.
CARL THOMPSON.

Witnesses:
ALFRED ANDERSON,
J. T. PETERSON.